(12) United States Patent
Peng et al.

(10) Patent No.: US 11,166,017 B2
(45) Date of Patent: Nov. 2, 2021

(54) REINFORCEMENT LEARNING METHOD FOR VIDEO ENCODER

(71) Applicant: NATIONAL CHIAO TUNG UNIVERSITY, Hsinchu (TW)

(72) Inventors: Wen-Hsiao Peng, Hsinchu (TW); Yung-Han Ho, Hsinchu (TW); Guo-Lun Jin, Hsinchu (TW); Yun Liang, Hsinchu (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 73 days.

(21) Appl. No.: 16/855,190

(22) Filed: Apr. 22, 2020

(65) Prior Publication Data

US 2020/0344472 A1 Oct. 29, 2020

Related U.S. Application Data

(60) Provisional application No. 62/837,423, filed on Apr. 23, 2019.

(51) Int. Cl.
*H04N 19/114* (2014.01)
*G06K 9/00* (2006.01)
*G06K 9/62* (2006.01)
*H04N 19/184* (2014.01)

(52) U.S. Cl.
CPC ....... *H04N 19/114* (2014.11); *G06K 9/00744* (2013.01); *G06K 9/6262* (2013.01); *H04N 19/184* (2014.11)

(58) Field of Classification Search
None
See application file for complete search history.

(56) References Cited

PUBLICATIONS

Helle et al. "Reinforcement Learning for Video Encoder Control in HEVC", 2017, IEEE, Internal Conference on Systems, Signals and Image Processing. (Year: 2017).*

* cited by examiner

*Primary Examiner* — James M Anderson, II
(74) *Attorney, Agent, or Firm* — Birch, Stewart, Kolasch & Birch, LLP

(57) ABSTRACT

A reinforcement learning method for frame-level bit allocation is disclosed. The reinforcement learning method includes steps of: (a) at a testing time, computing a state according to a plurality of features; (b) determining an action according to a policy; (c) determining a number of bits allocated to an i-th frame in a group of pictures (GOP) according to the action, a GOP-level bit budget and the state, wherein i is a positive integer; (d) encoding the i-th frame according to the number of bits allocated to the i-th frame in the GOP; and (e) repeating the steps (a)~(d) until an end of the GOP.

20 Claims, 8 Drawing Sheets

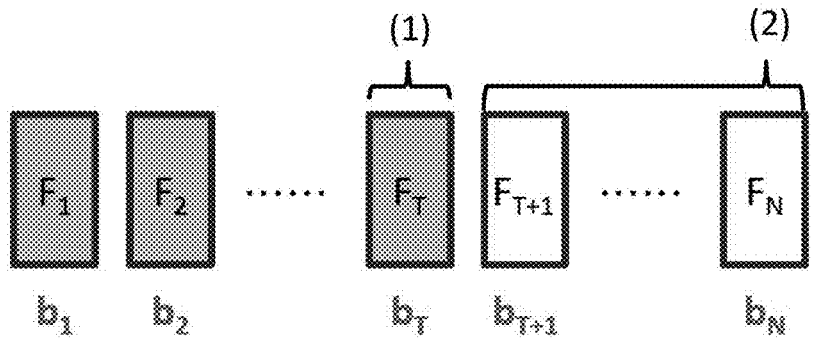
FIG. 6
$$r_T = -D_T(b_T) - P_{over} \times \frac{Actual - Target}{Target} \times 100\% - \sum_{T+1}^{N} D_i(b_i)$$
FIG. 7
$$r_T = -D_T(b_T) - P_{under} \times \frac{Target - Actual}{Target} \times 100\%$$
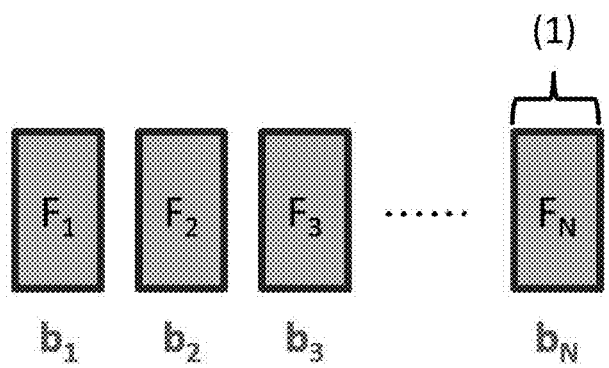
FIG. 8

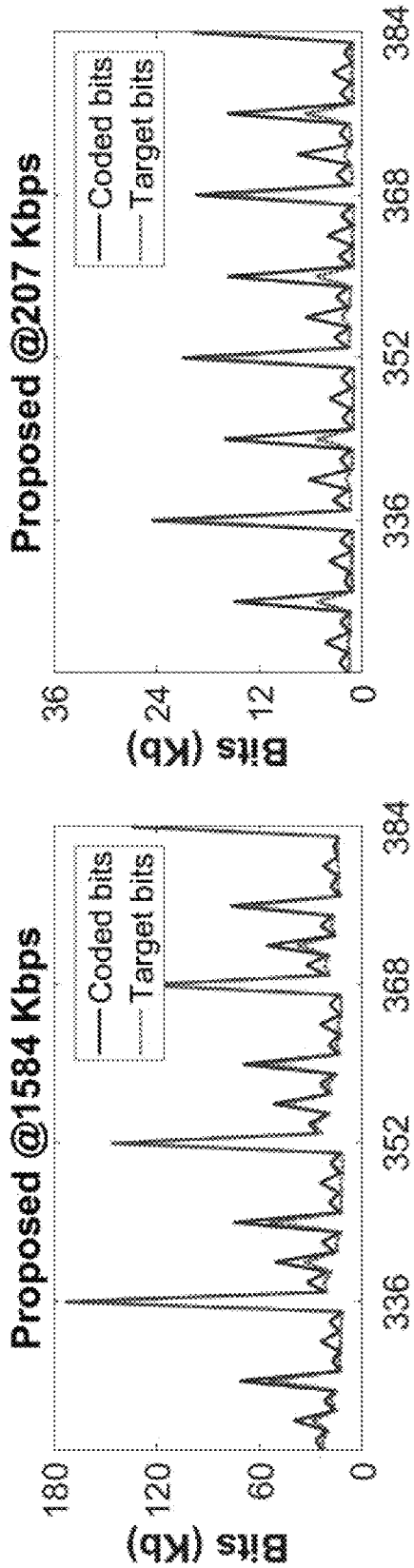
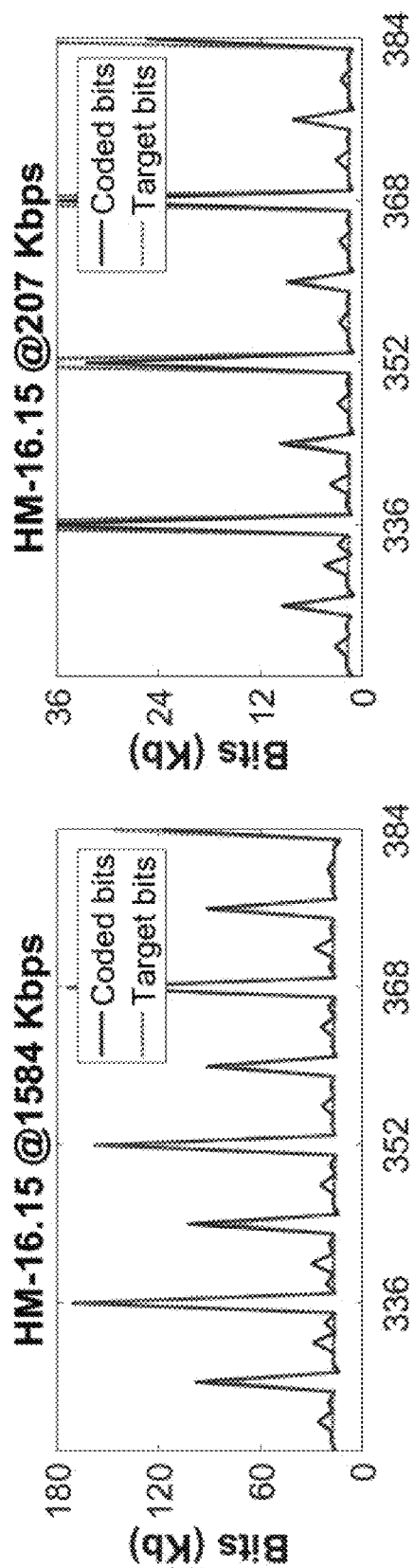
FIG. 12E
FIG. 12F
FIG. 12G
FIG. 12H

REINFORCEMENT LEARNING METHOD FOR VIDEO ENCODER

CROSS REFERENCE TO RELATED APPLICATIONS

This non-provisional application claims the benefit under 35 U.S.C. § 119(e) to U.S. Provisional Application No. 62/837,423, filed on Apr. 23, 2019, which is hereby expressly incorporated by reference into the present application.

BACKGROUND OF THE INVENTION

1. Field of the Invention

The invention relates to video encoder; in particular, to a reinforcement learning (RL) method for video encoder.

2. Description of the Prior Art

For the video encoder, how to allocate bits to each video frame in a group-of-picture (GOP) subjective to a rate constraint is one critical step in video bit rate control. The objective is to make most effective use of bit budget so as to minimize the cumulative distortions. Optimal bit allocation is often made difficult due to the inter-dependencies between video frames. This is a classic problem in video encoder control. A considerable number of prior works have been proposed. Two quintessential approaches assigning a hierarchy of weights to video frames according to their reference dependencies are provided.

A video frame that is high up in the hierarchy and serves as a reference for more future frames is usually weighted more heavily. Bit allocation is done by dividing the bit balance in proportion to these pre-determined weights.

Although simple, these approaches are far from being optimal because the weighting is often empirical. Inspired by the phenomenal success of reinforcement learning (RL), RL is introduced to applications of bit allocation. RL lends itself to decision making problems, especially those that involve dependent decisions guided by a long-term benefit. Up to now, only few attempts have been made to apply RL to video encoder control. Among these, the prior arts of training an RL agent to perform coding unit split decision and intraframe rate control and using RL for complexity aware mode decision are provided.

SUMMARY OF THE INVENTION

Therefore, the invention provides a reinforcement learning (RL) method for video encoder to solve the above-mentioned problems occurred in the prior arts.

A preferred embodiment of the invention is a reinforcement learning method for video encoder. In this embodiment, the reinforcement learning method includes steps of: (a) at a testing time, computing a state according to a plurality of features; (b) determining an action according to a policy; (c) determining a number of bits allocated to an i-th frame in a group of pictures (GOP) according to the action, a GOP-level bit budget and the state, wherein i is a positive integer; (d) encoding the i-th frame according to the number of bits allocated to the i-th frame in the GOP; and (e) repeating the steps (a)~(d) until an end of the GOP.

In an embodiment, the reinforcement learning method is used for frame-level bit allocation or intra-frame bit allocation; the reinforcement learning method is applied to a reinforcement learning system including an agent and an environment to allocate appropriate bits to each frame in the GOP, so that a GOP-level distortion is minimized subject to a GOP-level bit budget.

In an embodiment, at a time step, the agent is configured to observe the state from the environment and take the action according to the policy.

In an embodiment, the policy describes a behavior of the agent and the policy is considered a stochastic mapping from the state to the action to define a distribution over the action conditioned on the state.

In an embodiment, upon taking the action, the agent receives an immediate reward and a new state from the environment, and dynamics of the environment is defined by a transition distribution.

In an embodiment, the agent is a frame-adaptive bit allocation algorithm and the environment is an encoder for encoding the i-th frame to match the number of bits allocated to the i-th frame in the GOP.

In an embodiment, the action is a real number between 0 and 1 specifying a ratio of the number of bits allocated to the i-th frame in the GOP to the GOP-level bit budget.

In an embodiment, after the i-th frame is encoded, the immediate reward is computed to be a negative mean squared error of the i-th frame due to compression.

In an embodiment, the plurality of features includes an intra-frame feature (mean and variance of pixel values), an inter-frame feature (mean and variance of residuals), an average of intra-frame features over remaining frames, an average of inter-frame features over the remaining frames, a percentage of remaining bits, a temporal identification of a current frame, a number of the remaining frames in the GOP and bits per pixel (a bit rate/a frame rate).

In an embodiment, an interaction between the agent and the environment is ended in a terminal state.

In an embodiment, the terminal state corresponding to underflow of the GOP-level bit budget is that when all frames in the GOP are successfully encoded, there are still leftover bits.

In an embodiment, an immediate reward for the frames in the GOP is penalized by a value proportional to a percentage of the leftover bits.

In an embodiment, the terminal state corresponding to overflow is that all bits are run out, but remaining frames in the GOP are not encoded.

In an embodiment, an immediate reward for a last encoded frame in the GOP is penalized by a large negative value proportional to a number of the remaining frames.

In an embodiment, each frame in the GOP is characterized with an intra-frame feature and an inter-frame feature; the intra-frame feature and the inter-frame feature of the frame are computed before the frame is encoded.

In an embodiment, the intra-frame feature summarizes a texture complexity of the frame in terms of mean and variance of pixel values of the frame, while the inter-frame feature collects the texture complexity of the frame from mean and variance of prediction residuals of the frame.

In an embodiment, the prediction residuals of the frame are approximated by forming a zero-motion prediction of the frame in question from reference frames.

In an embodiment, the zero-motion prediction is uni-prediction or bi-prediction.

In an embodiment, when the agent is trained with Deep Deterministic Policy Gradient (DDPG) algorithm in a continuous action space, the agent includes an actor and a critic implemented with two dedicated neural networks; the actor is configured to determine the action and the critic is configured to evaluate a value of the action taken by the actor in the state.

In an embodiment, at a training time, the critic is learned by minimizing a loss between a predicted immediate reward and an actual immediate reward, while the actor is updated by using a policy gradient to maximize the value evaluated by the critic; at the testing time, the actor plays a role of the agent.

The advantage and spirit of the invention may be understood by the following detailed descriptions together with the appended drawings.

BRIEF DESCRIPTION OF THE APPENDED DRAWINGS

FIG. 5 and FIG. 6 illustrate embodiments of the uni-prediction features being the mean and variance of uni-prediction residuals.

FIG. 7 and FIG. 8 illustrate embodiments of overflow and underflow of the GOP-level bit budget occur at the training time respectively.

FIG. 11A~FIG. 11D illustrate experimental results of the GOP bit rate as a function of GOP index respectively.

FIG. 12A~FIG. 12H illustrate experimental results of comparing the bit allocation of the proposed model and the baseline for two sequences coded at the lowest and highest bit rates respectively.

Figure 13:
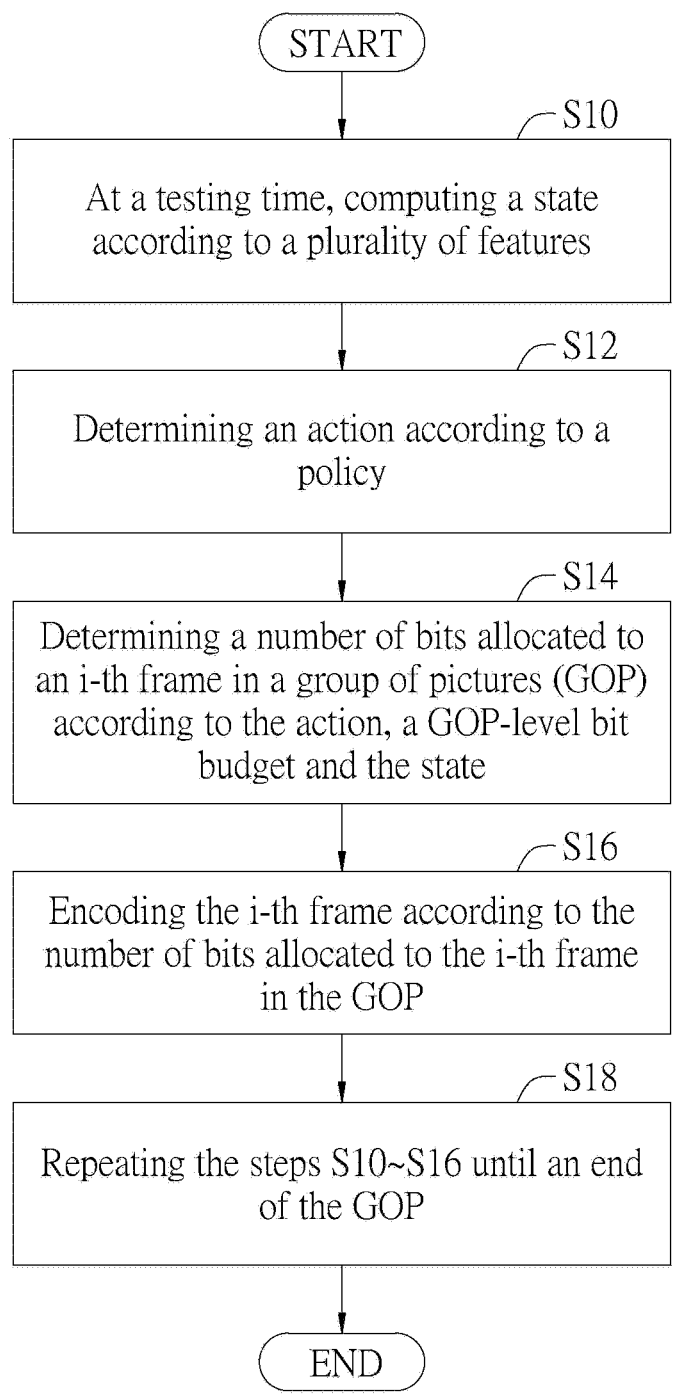

FIG. 13 illustrates a flowchart of the reinforcement learning method for video encoder in an embodiment of the invention.

DETAILED DESCRIPTION OF THE INVENTION

Reference will now be made in detail to the exemplary embodiments, the same or similar reference numbers or components used in the drawings and the embodiments are used to represent the same or similar parts.

A preferred embodiment of the invention is a reinforcement learning (RL) method for video encoder. In this embodiment, the reinforcement learning method can help the video encoder to allocate bits to each video frame in a group of pictures subjective to a rate constraint, but not limited to this.

It should be mentioned that the bit allocation problem (such as the frame-level bit allocation problem or the intra-frame bit allocation problem) is formulated as a reinforcement learning problem in the invention. A neural network is trained to determine the number of target bits for each frame in a GOP based on observing the intra-frame and inter-frame texture complexities and the bit budget. Both state signals are updated on the fly as the encoding moves along. Experimental results show that the model of the invention has more stable control of GOP-level bit rates while offering better PSNR performance as compared to the rate control scheme in HM-16.15.

The remainder of this invention is organized as follows: [Section I] recites the RL basics of the invention; [Section II] formulates the bit allocation problem as an RL problem in the invention; [Section III] details the network design and training procedure of the invention; [Section IV] presents experimental results of the invention; and [Section V] concludes this invention.

Section I

Figure 1:
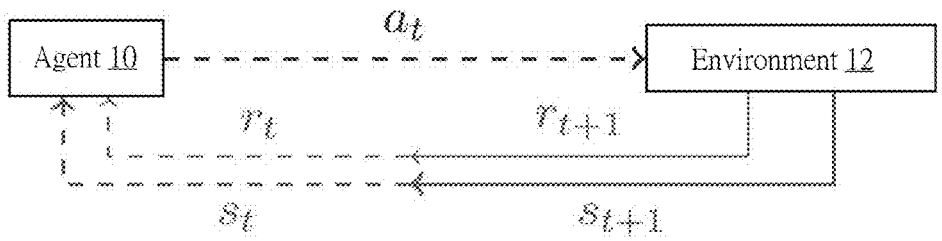
FIG. 1 illustrates a schematic diagram of a standard RL setup, where an agent 10 interacts with an environment 12 in discrete time steps.

[Section I] reviews the reinforcement learning (RL) basics to facilitate the understanding of our proposed reinforcement learning method for the video encoder. Please refer to FIG. 1. FIG. 1 illustrates a schematic diagram of a standard reinforcement learning system including an agent 10 and an environment 12, wherein the agent 10 interacts with the environment 12 in discrete time steps.

At each time step t, the agent 10 observes a state $s_t$ from the environment 12 and takes an action $a_t$ based on a policy $\pi(a_t|s_t)$ that describes the behavior of the agent 10. The policy is generally considered a stochastic mapping from the state to the action, defining a distribution over the action $a_t$ conditioned on the state $s_t$. This general interpretation includes deterministic policies as a special case.

Upon taking the action $a_t$, the agent 10 receives an immediate reward $r_{t+1}$ and a new state $s_{t+1}$ from the environment 12, and dynamics of the environment 12 can be defined by a transition distribution $p(r_{t+1}, s_{t+1}|s_t, a_t)$. In other words, $r_{t+1}, s_{t+1} \sim p(r_{t+1}, s_{t+1}|s_t, a_t)$. It should be noted that the interaction between the agent 10 and the environment 12 continues indefinitely in continuing tasks, or ends in a terminal state in episodic tasks.

The goal of the reinforcement learning (RL) is to learn an optimal policy $\pi(a_t|s_t)$ which together with dynamics $p(r_{t+1}, s_{t+1}|s_t, a_t)$ of the environment 12 and an initial state distribution $p(s_0)$ to yield a maximal expected total reward as shown in Equation (1):

$$E\left[\sum_{k=0}^{\infty} \gamma^k r_{k+1} = r_1 + \gamma r_2 + \gamma^2 r_3 + \ldots \right], \quad (1)$$

wherein $\gamma \in [0, 1]$ is a discount factor for ensuring that the sum is convergent in continuing tasks. Intuitively, the optimal policy $\pi(a_t|s_t)$ is to assign a high probability to sequences $s_0, a_0, r_1, s_1, a_1, r_2, s_2, \ldots$ with larger cumulative reward $\Sigma_{k=0}^{\infty} \gamma^k r_{k+1}$. It is seen that the joint probability of any such sequence is critically dependent on $\pi(a_t|s_t)$ as shown in Equation (2):

$$p(s_0, a_0, r_1, s_1, a_1, r_2, s_2, \ldots) = p(s_0) \prod_{i=0}^{\infty} \pi(a_t|s_t) p(r_{t+1}, s_{t+1}|s_t, a_t), \quad (2)$$

wherein the initial state distribution $p(s_0)$ and the dynamics $p(r_{t+1}, s_{t+1}|s_t, a_t)$ of the environment 12 are beyond the control of the agent 10.

Section II

In [Section II], the bit allocation problem is formulated as a reinforcement learning problem.

The objective of the invention is to allocate appropriate bits to each frame in a group of pictures (GOP), such that a GOP-level distortion is minimized subject to a GOP-level bit budget. In symbols, we have Equation (3) as follows:

$$\operatorname*{argmin}_{\{b_i\}} \sum_{i=1}^{N} D_i(b_i) \text{ s.t.} \sum_{i=1}^{N} R_i(b_i) = R_{GOP}, \quad (3)$$

wherein bi denotes the number of bits allocated to the i-th frame in the GOP, Di is the distortion (in mean-squared error) incurred by encoding frame Fi to match bi, Ri is the actual number of bits produced by the encoder and RGOP is the GOP-level bit budget. Ideally Ri(bi) should be identical to bi; however, in fact, the encoder may fail to match exactly bi. With Equation (3), the determination of $\{b_i\}_{i=1}^{N}$ for a GOP is turned into a RL problem. And, every frame in the GOP is encoded.

Figure 2:
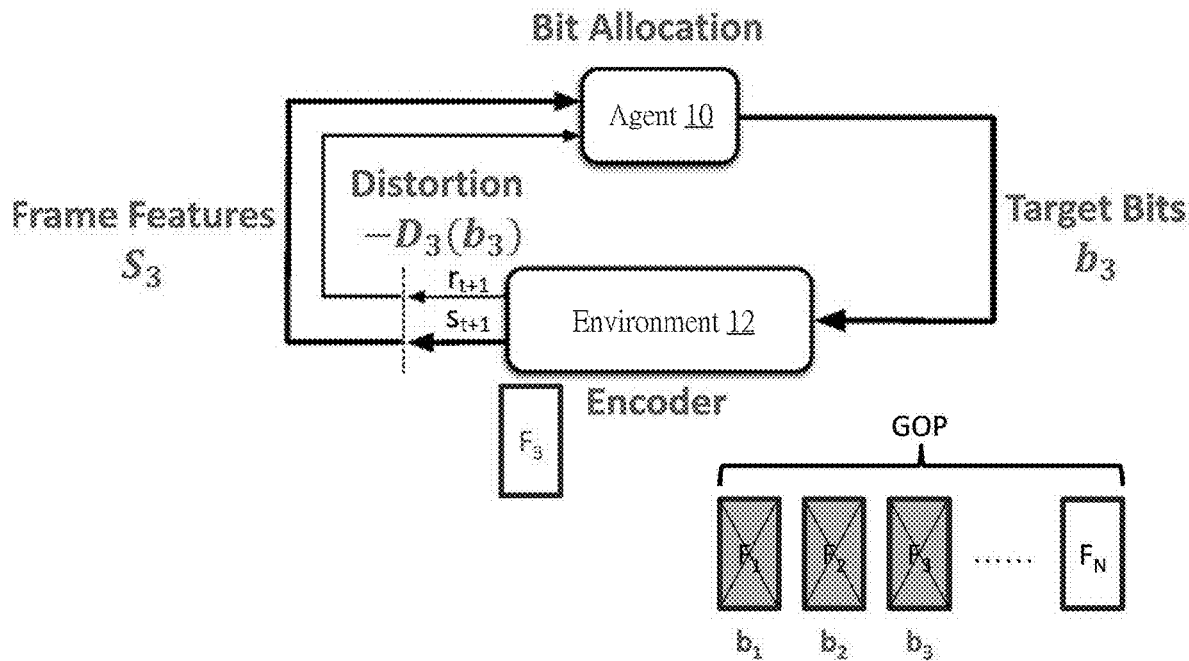
FIG. 2 illustrates an embodiment that the bit allocation problem is formulated as a reinforcement learning problem.

Please refer to FIG. 2. FIG. 2 illustrates an embodiment that the bit allocation problem is formulated as a reinforcement learning problem.

In this embodiment, the agent 10 is a frame-adaptive bit allocation algorithm. The action $a_i \in [0, 1]$ output by the agent 10 is a real number between 0 and 1 specifying the ratio of the $b_i$ to the GOP-level bit budget RGOP-i.e., $b_i$=the action $a_i \times$ the GOP-level bit budget $R_{GOP}$. The environment 12 is an encoder for encoding the i-th frame Fi to match $b_i$.

The immediate reward $r_i$ after the encoding of frame Fi is computed to be $-1 \times D_i(b_i)$, the negative mean squared error of the i-th frame Fi due to compression. The multiplication of the distortion $D_i(b_i)$ by minus one accounts for our desire to minimize the distortion by maximizing the reward. The state $s_i$ on which the action $a_i$ is based includes the handcrafted features listed in Table I.

TABLE I

State Definition Components

| | |
|---|---|
| 1 | Intra-frame feature (mean and variance of pixel values) |
| 2 | Inter-frame feature (mean and variance of residuals) |
| 3 | Average of intra-frame features over the remaining frames |
| 4 | Average of inter-frame features over the remaining frames |
| 5 | Percentage of the remaining bits |
| 6 | Temporal identification of the current frame |
| 7 | Number of remaining frames in the GOP |
| 8 | Bits per pixel (i.e., bit rate/frame rate) |

At the testing time, the reinforcement learning method in this embodiment includes the following steps of:
(1) computing the state $s_i$ according to the features in Table I;
(2) determining the action $a_i$, and consequently $b_i$ (the number of bits allocated to the i-th frame in the GOP) by $b_i$=the action $a_i \times$ the GOP-level bit budget $R_{GOP}$, through the agent 10 with the state $s_i$ as input;
(3) encoding the frame Fi according to bi; and
(4) repeating the above steps (1)~(3) until the end of the GOP.

Figure 3A:
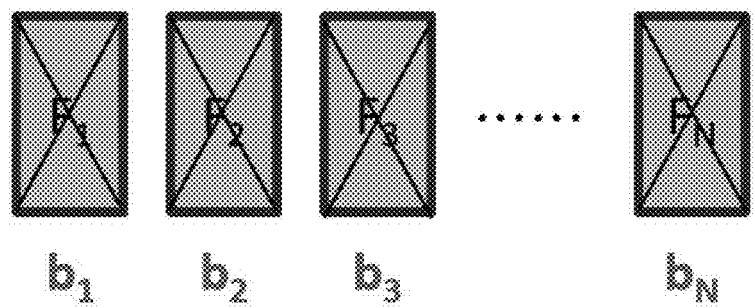
FIG. 3A illustrates an embodiment of the terminal state that all frames $F_1 \sim F_N$ in the GOP are successfully encoded.
Figure 3B:
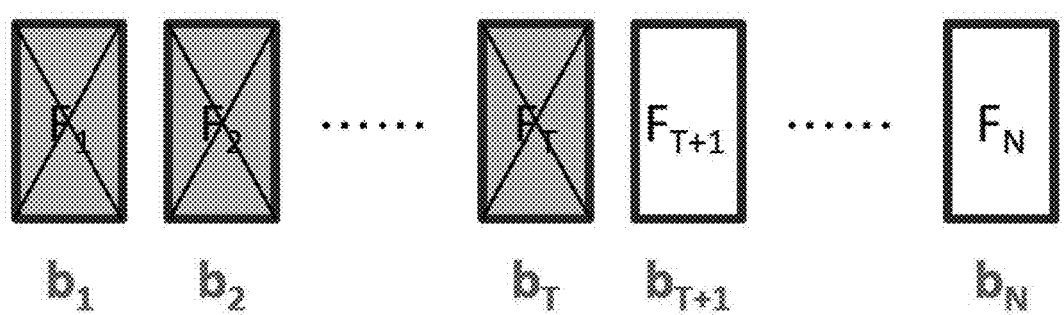
FIG. 3B illustrates an embodiment of the terminal state that all bits $b_1 \sim b_T$ are run out, but some frames $F_{T+1} \sim F_N$ are not encoded.

It should be noted that the interaction between the agent 10 and the environment 12 can be ended in a terminal state in episodic tasks. Please refer to FIG. 3A and FIG. 3B. As shown in FIG. 3A, the terminal state is that all frames $F_1 \sim F_N$ in the GOP are successfully encoded. As shown in FIG. 3B, the terminal state is that all bits $b_1 \sim b_T$ are run out, but some frames $F_{T+1} \sim F_N$ are not encoded.

Then, the definition of the state $s_i$ will be discussed. From above, it can be found that the state $s_i$ serves as the only basis for the agent 10 to compute the action $a_i$. It has to be informative enough in order to produce a reasonable estimate of the target number of bits for the frame Fi.

To this end, each frame in the GOP should be characterized with two types of features: the intra-frame feature and the inter-frame feature. The former summarizes a texture complexity of the frame in terms of the mean and the variance of its pixel values, while the latter collects the same statistics from its prediction residuals.

For simplicity, the residual signals are approximated by forming a zero-motion prediction of the frame in question from its reference frames. The approximation is done for all possible prediction types, including uni-prediction from each of the reference frames in the lists L0 and L1, and bi-prediction from various combinations of the reference frames in one from each of the lists.

Figure 4:
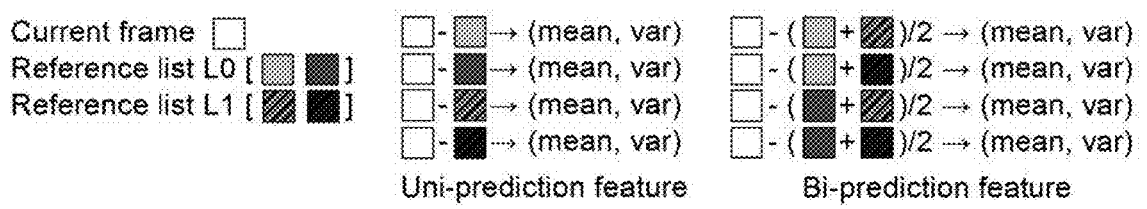
FIG. 4 illustrates an embodiment of the uni-prediction features and the bi-prediction features according to the current frame and the reference lists L0~L1.
Figure 5:
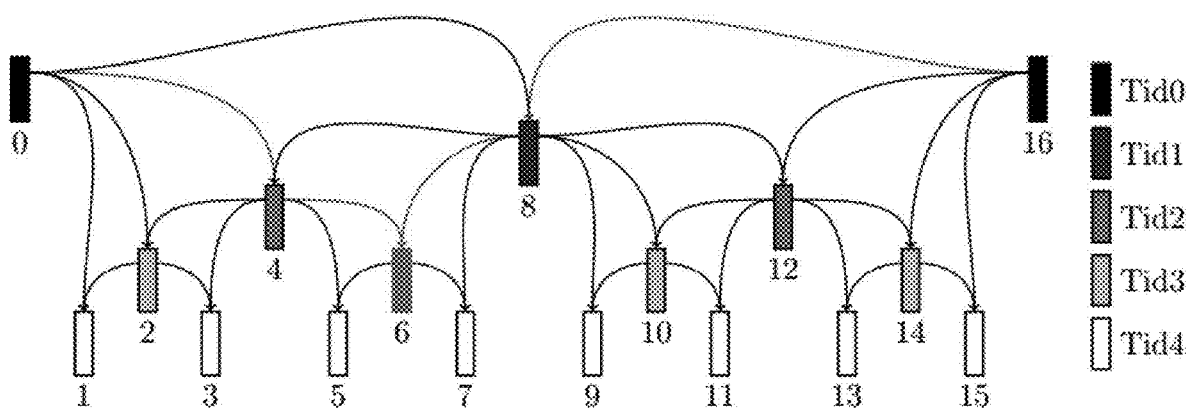

Please refer to FIG. 4. FIG. 4 illustrates an embodiment of the uni-prediction features and the bi-prediction features according to the current frame and the reference lists L0~L1. By doing so, the prediction structure of the GOP is assumed to be known and fixed; that is to say, the inter-frame dependencies are known a priori. Therefore, the intra- and inter-frame features for every frame in the GOP can be computed before encoding the frame. It is thus possible that the reference frame may not be encoded yet when it must be used for feature extraction. In such cases, we turn to its original frame. As shown in FIG. 5 and FIG. 6, the uni-prediction features are the mean and variance of uni-prediction residuals.

Now that the inter- and intra-frame features have been collected for the current frame Fi, every remaining frame in the GOP can be done in the same way and their features can be pulled together by taking an element-wise average. The resulting feature vector becomes part of the state $s_i$ to serve as an indication of the average complexity of the remaining frames.

It is the goal that conditioned on the complexity of the frame Fi, the average complexity of the remaining frames in the GOP, and the other factors—such as the temporal identification of frame Fi and the number of remaining bits—the agent 10 can learn to allocate a proper portion of the bit budget to the frame Fi. These conditioning variables, referred collectively to as the state are updated after encoding each frame.

It should be noted that the residual signals for inter feature computation will be updated when their reference frames become available along the way. They may have initially be computed based on the original frames.

Then, the reward signals for extreme cases will be discussed as follows. At the training time, two extreme cases corresponding to overflow and underflow of the GOP-level bit budget may occur.

Please refer to FIG. 7. For the overflow case, since the cumulative coded bits after encoding a frame exceeds the GOP-level bit budget, the episode will end early in a terminal state. To avoid the terminal state from being reached at the testing time, the immediate reward $r_T$ for the last encoded frame $F_T$ of the early-terminated condition is penalized by a large negative value $P_{over}$ proportional to the number of remaining frames $F_{T+1} \sim F_N$, wherein T<N.

For example, when the terminal state is reached after encoding the 4-th frame $F_4$ in a GOP of size 16 (including the frames $F_1$~$F_{16}$), the penalty $P_{over}$ is set to −100×(16−4). That is to say, the earlier the bit budget is exceeded, the smaller the reward is.

Please refer to FIG. 8. For the underflow case, since there are leftover bits after encoding the entire GOP, the agent 10 will be also penalized. Specifically, the penalty $P_{under}$ is distributed among the frames $F_1$~$F_N$ in the GOP by multiplying their distortions by the percentage of the leftover bits $b_{N+1}$~$b_T$, wherein T>N.

In other words, when there are more leftover bits $b_{N+1}$~$b_T$ in the episode, the immediate reward $r_T$ for each frame becomes smaller; therefore, the agent 10 is guided not to produce such cases.

Section III

In [Section III], the agent 10 is trained with Deep Deterministic Policy Gradient (DDPG) algorithm which is an RL algorithm for continuous action spaces. Recall that the output of the agent 10 is a real number between 0 and 1. It thus has a continuous action space.

Figure 9:
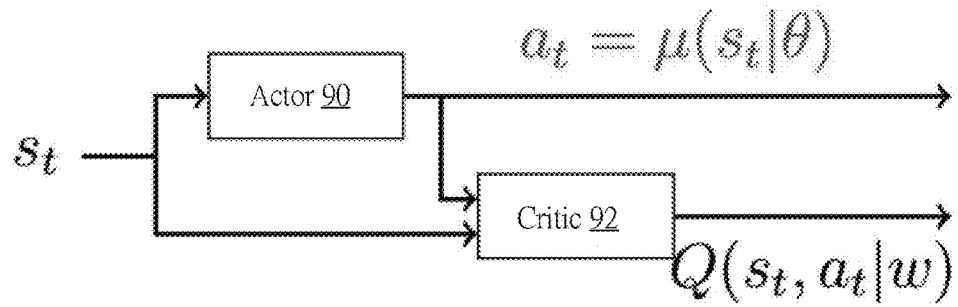
FIG. 9 illustrates an embodiment of the agent in the DDPG algorithm.
Figure 10:
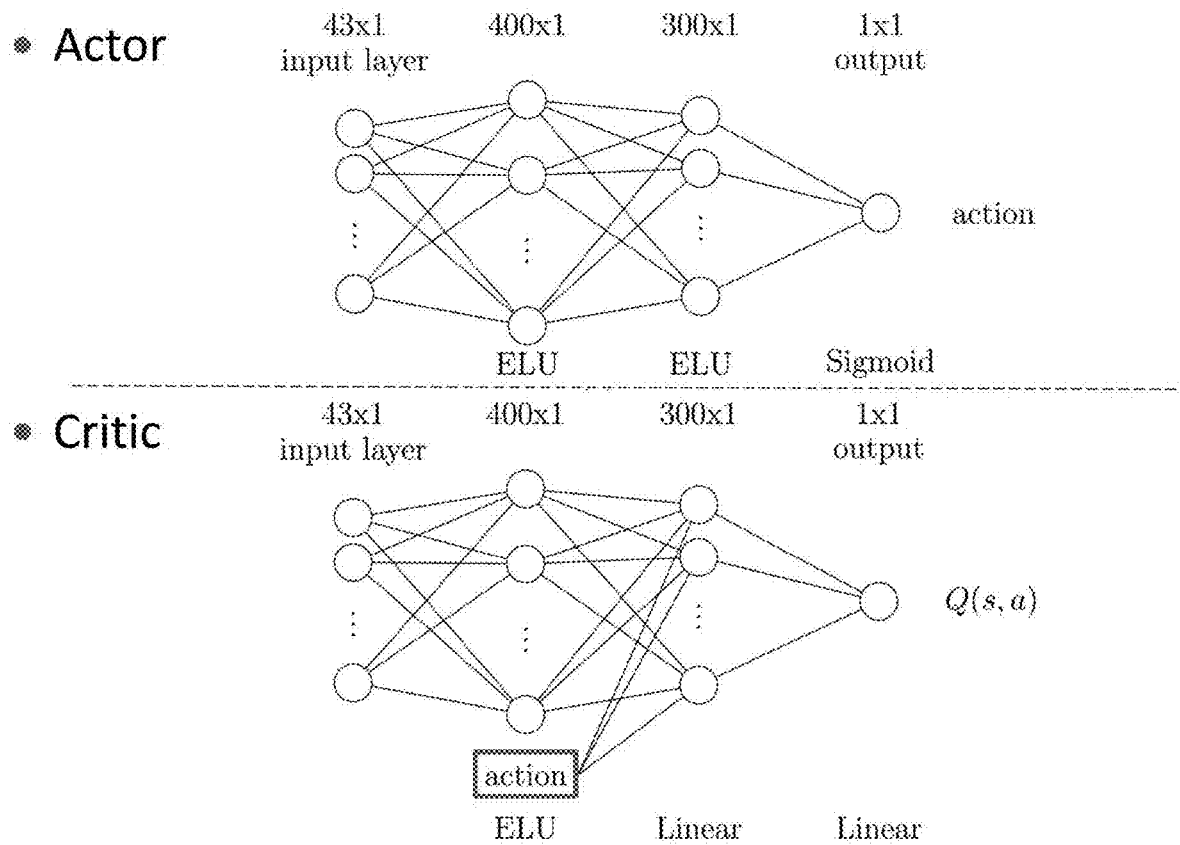
FIG. 10 illustrates an embodiment of the actor 90 and the critic 92 implemented with two dedicated neural networks.
Figure 11A:
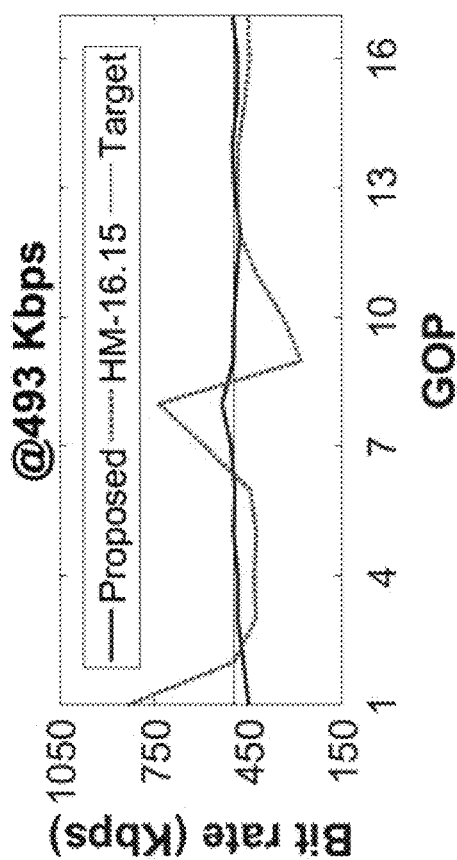
Figure 11B:
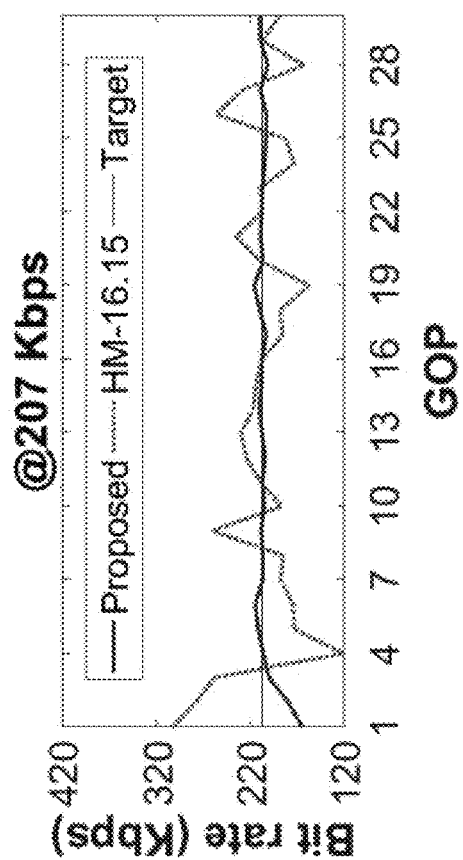
Figure 11C:
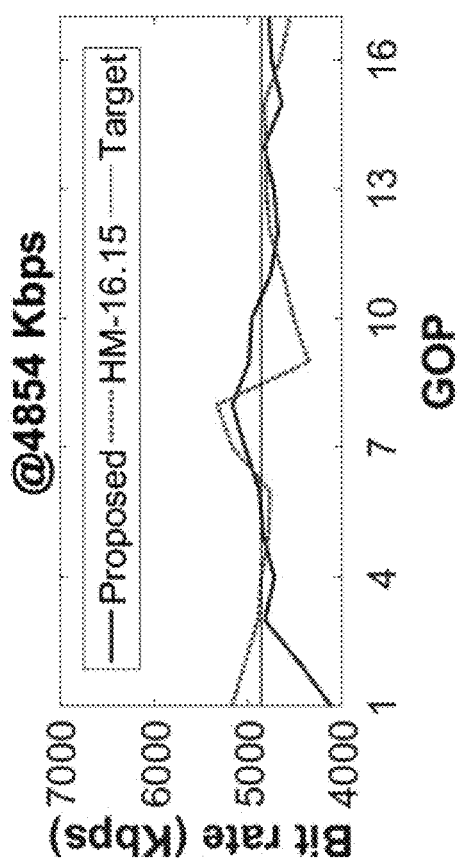
Figure 11D:
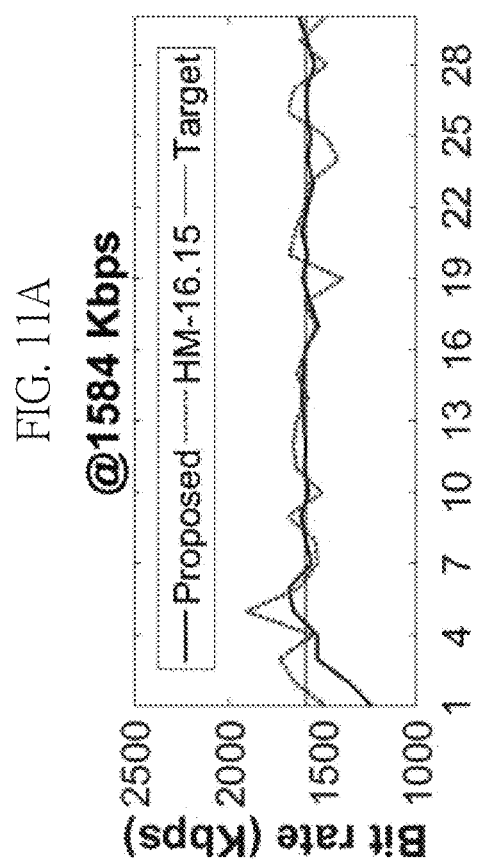
Figure 12B:
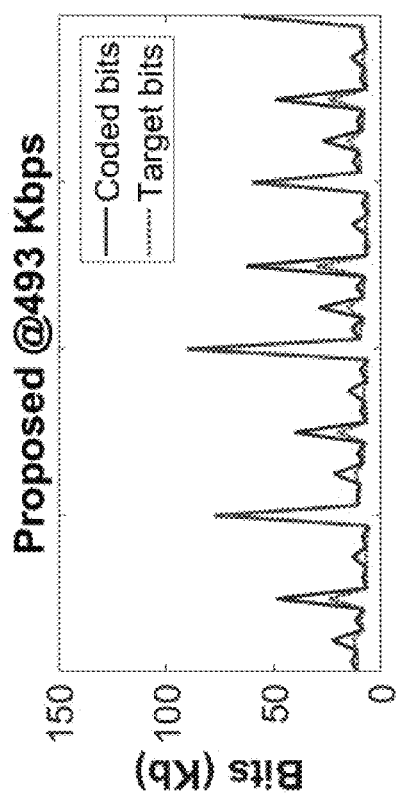
Figure 12D:
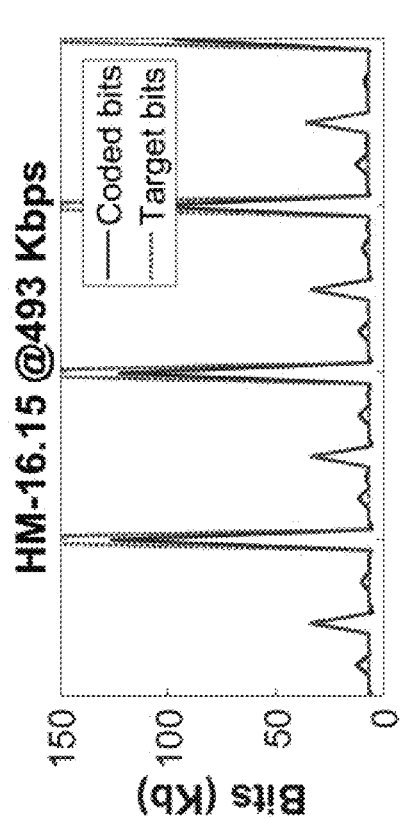
Figure 12A:
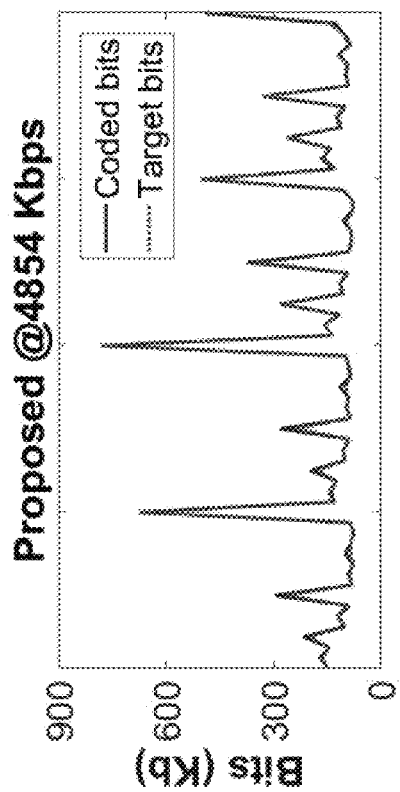
Figure 12C:
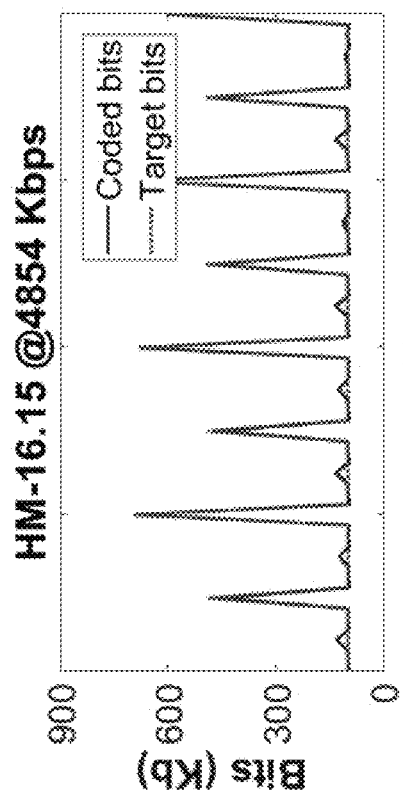

As shown in FIG. 9, the agent in the DDPG algorithm includes an actor 90 and a critic 92. The actor 90 is used for determining an action $a_t=\mu(s_t|\theta)$ and the critic 92 is used for evaluating the value $Q(s_t, a_t|w)$ of the action $a_t$ taken by the actor 90 in the state $s_t$. It should be noted that the actor 90 and the critic 92 are implemented with two dedicated neural networks, as shown in FIG. 10.

At the training time, the critic is learned by minimizing the loss between the predicted reward and the actual reward, while the actor $\mu(s|\theta)$ is updated using the policy gradient to maximize the action-value assessed by the learned critic. At the testing time, the actor network plays the role of the agent 10. Algorithm 1 details the training procedure in this embodiment.

| Algorithm 1 Training the agent with DDPG algorithm |
| --- |
| 1: Initizlize behavior critic Q(s, a\|w) and behavior actor $\mu$(s\|θ) with w,θ |
| 2: Initialize target critic Q'(s, a\|w') with weights w' ← w |
| 3: Initialize target actor $\mu$'(s\|θ') with weights θ' ← θ |
| 4: Initialize Replay buffer R |
| 5: for episode = 1 to M do |
| 6:    Initialize a random noise process $\mathcal{N}$ for action exploration |
| 7:    Receive initial observaion state $s_0$ |
| 8:    for frame i = 0 to $N_{frames}$ − 1 in a GOP do |
| 9:      if remaining bits < 0 |
| 10:       Reach the early terminal state, break |
| 11:      Select action $a_i = \mu(s_i|\theta) + \mathcal{N}_i$ |
| 12:      Compute the bit budget $b_i = a_i \times R_{GOP}$ |
| 13:      Encode frame i with $b_i$ and observe reward $r_{i+1}$ and new state $s_{i+1}$ |
| 14:    end for |
| 15:    Update $r_{i+1}$ and store transitions ($s_i$, $a_i$, $r_{i+1}$, $s_{i+1}$) in R |
| 16:    Sample a minibateh of N unnsitions ($s_n$, $a_n$, $r_{n+1}$, $s_{n+1}$) from R |
| 17:    Set $y_n = r_{n+1} + \gamma Q'(s_{n+1}, \mu'(s_{n+1}|\theta')|w')$ |
| 18:    Update the behavior critic by minimizing $(y_n - Q(s_n, a_n|w))^2$ |
| 19:    Update the behavior actor using the sampled policy gradient |
| 20:    Update the target critic and actor networks |
| 21: end for |

For complexity considerations, the actor and critic each are implemented by a network with only three fully-connected layers. They are trained on 4 sequences—namely, BasketballDrill, PartyScene (Class C), BQSquare and BlowingBubbles (Class D)—from the common test conditions of HEVC/H.265 and under the random access (RA) configuration (See FIG. 5 and FIG. 6). Specifically, the GOP includes 1 I-frame and 15 B-frames. In addition, the target bits are set by encoding the training sequences with fixed QP's 22, 27, 32 and 37.

For experiments, the scheme is implemented on HM-16.15 and its performance is compared with the built-in bit allocation algorithm (referred hereafter to as the baseline). The test is carried out under the random-access configuration, with one intra frame (I-frame) encoded within each GOP of size 16.

Moreover, four target bit rates determined by fixed QP encoding as for training are tested. These sequence-level bit rates are carried over to every GOP as target GOP-level bit rates. The objective is to have a constant GOP bit rate.

TABLE II

| | Bit Rate Error and Variation | | | | |
| --- | --- | --- | --- | --- | --- |
| | Bit rate | HM-16.15 | | Proposed | |
| Sequences | Kbps | Err. (%) | Var. (%) | Err. (%) | Var. (%) |
| BQMall | 4217 | 0.37 | 4.04 | 0.71 | 4.99 |
| | 607 | 3.44 | 18.54 | 0.53 | 5.13 |
| RaceHorsesC | 4854 | 0.03 | 3.94 | 0.95 | 3.39 |
| | 493 | 0.92 | 17.49 | 0.41 | 2.45 |
| BasketballPass | 1584 | 0.25 | 5.88 | 0.28 | 2.74 |
| | 207 | 1.21 | 15.25 | 0.72 | 2.37 |
| RaceHorses | 1222 | 0.11 | 3.01 | 0.45 | 2.79 |
| | 153 | 2.12 | 14.84 | 0.60 | 1.59 |

Table II measures the bit rate error and variation for the highest and lowest tested bit rates. The former is computed as $|R_t-R_a|/R_a \times 100\%$, where $R_t$ and $R_a$ are the sequence level target and actual bit rates, respectively. The latter measures the average bit rate error at the GOP level; that is to say, $(\Sigma_{i=1}^{N}|R_g(i)-R_t|/R_t \times 100\%)/N$, with $R_g(i)$ denoting the actual bit rate of the i-th GOP.

From Table II, the model of this embodiment matches the target bit rates quite closely and the fluctuation in GOP-level bit rate is much less significant than the baseline, especially at low bit rates. This is also corroborated by FIG. 11A~FIG. 11D visualizing the GOP bit rate as a function of GOP index.

The reason why the baseline model has difficulty maintaining a constant GOP bit rate is that it implements a sequence-level bit allocation for I-frames. Specifically, the number of bits allocated to each I-frame is a function of the remaining bits per frame in a sequence, and is not constrained by the GOP-level bit budget, which only influences the bit allocation of B-frames.

Another factor that contributes to the fluctuation is that to minimize the bit rate error at the sequence-level, the baseline adopts a windowing mechanism: when a current GOP has an actual bit rate higher than (respectively, lower than) the target, the following GOPs will compensate for the difference by decreasing (respectively, increasing) their target bit rates. By contrast, our design always subjects its bit allocation to the GOP-level rate constraint.

Please refer to FIG. 12A~FIG. 12H. FIG. 12A~FIG. 12H compare the bit allocation of the proposed model and the baseline for two sequences coded at the lowest and highest bit rates. The number of actual coded bits is presented for each case. It can be found that the proposed model allocates more bits to I-frames and B-frames with lower temporal identification (Tid's), which is consistent with the results produced by the man-made baseline.

However, the two schemes exhibit different behaviors at different bit rates. At the low rates, the proposed scheme weights less heavily on I-frames, whereas the baseline adds more weight to them. At the high rates, the proposed scheme starts to allocate bits to B-frames across different Tid's, whereas the baseline almost always favors B-frames with the lowest Tid.

Another important point to note is that with the proposed model there may be a bias between the numbers of target bits and actual bits for B-frames, especially at low bit rates. This is attributed to the fact that HM-16.15 adopts a time-varying mapping between the number of target bits and the corresponding frame-level initial QP. The mapping should ideally be updated over time so that the actual number of bits would match the target closely.

With the proposed model, such mapping is made fixed at both training and test time for stationary environment dynamics. The fixed mapping then implies an approximately fixed yet likely biased relationship between the target and actual bit rates. Despite the potential bias, the RL framework allows the agent to learn the bias so that it knows how to set the target bit rate in order to get the desired actual bit rate. As such, in the proposed case, the actual bit rates reflect more accurately the bit allocation done by the agent.

TABLE III

BD-PSNR Relative to HM Baseline

| Components | Y (dB) | U (dB) | V (dB) | YUV (dB) |
|---|---|---|---|---|
| BQMall | −0.206 | −1.253 | −1.237 | 0.331 |
| RaceHorses | 0.300 | −0.386 | −0.302 | 0.147 |
| BasketballPass | 0.285 | −0.350 | −0.159 | 0.370 |
| RaceHorses | 0.368 | −0.388 | −0.368 | 0.377 |

Table III shows the BD-PSNR of our scheme over the baseline. Positive values mean higher PSNR. From left to right, the component-wise BD-PSNR is computed following the conventional method, whereas the right most column (YUV) denotes a specialized calculation where a mean squared error (MSE) is first computed with respect to all three components and video frames before it is converted into PSNR.

Specifically, such an MSE is computed as $(4 \times MSE_Y + MSE_U + MSE_V)/6$, wherein $MSE_Y$, $MSE_U$ and $MSE_V$ are the MSE of Y, U and V components respectively. This way of PSNR calculation reflects better the reward of our RL training, which is to minimize the GOP-level MSE.

From Table III, it can be found that an average BD-PSNR gain of 0.306 dB with the YUV method, which confirms that the RL agent does act to optimize the reward. However, it can be found that there are losses in the U and V components based on the conventional BD-PSNR metric.

Please refer to FIG. 13. FIG. 13 illustrates a flowchart of the reinforcement learning (RL) method for video encoder in an embodiment of the invention.

As shown in FIG. 13, the reinforcement learning method includes the following steps of:

S10: at a testing time, computing a state according to a plurality of features;

S12: determining an action according to a policy;

S14: determining a number of bits allocated to an i-th frame in a group of pictures (GOP) according to the action, a GOP-level bit budget and the state, wherein i is a positive integer;

S16: encoding the i-th frame according to the number of bits allocated to the i-th frame in the GOP; and S18: repeating the steps S10~S16 until an end of the GOP.

It should be noticed that the steps S10~S18 are only one embodiment of the invention, the scope of the invention is not limited by this embodiment.

Section IV

Above all, an RL method for video encoder is proposed in the invention. In the invention, an agent is trained to determine the number of target bits for each video frame in a GOP subject to a rate constraint. And, the proposed method of the invention has better control of GOP-level bit rate and shows lower mean squared error. It is believed that the reinforcement learning has great potential for video encoder control in the future.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A reinforcement learning method for a video encoder, comprising steps of:
   (a) at a testing time, computing a state according to a plurality of features;
   (b) determining an action according to a policy;
   (c) determining a number of bits allocated to an i-th frame in a group of pictures (GOP) according to the action, a GOP-level bit budget and the state, wherein i is a positive integer;
   (d) encoding the i-th frame according to the number of bits allocated to the i-th frame in the GOP; and
   (e) repeating the steps (a)~(d) until an end of the GOP.

2. The reinforcement learning method of claim 1, wherein the reinforcement learning method is used for frame-level bit allocation or intra-frame bit allocation; the reinforcement learning method is applied to a reinforcement learning system comprising an agent and an environment to allocate appropriate bits to each frame in the GOP, so that a GOP-level distortion is minimized subject to a GOP-level bit budget.

3. The reinforcement learning method of claim 2, wherein at a time step, the agent is configured to observe the state from the environment and take the action according to the policy.

4. The reinforcement learning method of claim 2, wherein the policy describes a behavior of the agent and the policy is considered a stochastic mapping from the state to the action to define a distribution over the action conditioned on the state.

5. The reinforcement learning method of claim 3, wherein upon taking the action, the agent receives an immediate reward and a new state from the environment, and dynamics of the environment is defined by a transition distribution.

6. The reinforcement learning method of claim 1, wherein the agent is a frame-adaptive bit allocation algorithm and the environment is an encoder for encoding the i-th frame to match the number of bits allocated to the i-th frame in the GOP.

7. The reinforcement learning method of claim 2, wherein the action is a real number between 0 and 1 specifying a ratio of the number of bits allocated to the i-th frame in the GOP to the GOP-level bit budget.

8. The reinforcement learning method of claim 5, wherein after the i-th frame is encoded, the immediate reward is computed to be a negative mean squared error of the i-th frame due to compression.

9. The reinforcement learning method of claim 1, wherein the plurality of features comprises an intra-frame feature (mean and variance of pixel values), an inter-frame feature (mean and variance of residuals), an average of intra-frame features over remaining frames, an average of inter-frame features over the remaining frames, a percentage of remaining bits, a temporal identification of a current frame, a number of the remaining frames in the GOP and bits per pixel (a bit rate/a frame rate).

10. The reinforcement learning method of claim 1, wherein an interaction between the agent and the environment is ended in a terminal state.

11. The reinforcement learning method of claim 10, wherein the terminal state corresponding to underflow of the GOP-level bit budget is that when all frames in the GOP are successfully encoded, there are still leftover bits.

12. The reinforcement learning method of claim 11, wherein an immediate reward for the frames in the GOP is penalized by a value proportional to a percentage of the leftover bits.

13. The reinforcement learning method of claim 10, wherein the terminal state corresponding to overflow is that all bits are run out, but remaining frames in the GOP are not encoded.

14. The reinforcement learning method of claim 13, wherein an immediate reward for a last encoded frame in the GOP is penalized by a large negative value proportional to a number of the remaining frames.

15. The reinforcement learning method of claim 1, wherein each frame in the GOP is characterized with an intra-frame feature and an inter-frame feature; the intra-frame feature and the inter-frame feature of the frame are computed before the frame is encoded.

16. The reinforcement learning method of claim 15, wherein the intra-frame feature summarizes a texture complexity of the frame in terms of mean and variance of pixel values of the frame, while the inter-frame feature collects the texture complexity of the frame from mean and variance of prediction residuals of the frame.

17. The reinforcement learning method of claim 16, wherein the prediction residuals of the frame are approximated by forming a zero-motion prediction of the frame in question from reference frames.

18. The reinforcement learning method of claim 17, wherein the zero-motion prediction is uni-prediction or bi-prediction.

19. The reinforcement learning method of claim 1, wherein when the agent is trained with Deep Deterministic Policy Gradient (DDPG) algorithm in a continuous action space, the agent comprises an actor and a critic implemented with two dedicated neural networks; the actor is configured to determine the action and the critic is configured to evaluate a value of the action taken by the actor in the state.

20. The reinforcement learning method of claim 19, wherein at a training time, the critic is learned by minimizing a loss between a predicted immediate reward and an actual immediate reward, while the actor is updated by using a policy gradient to maximize the value evaluated by the critic; at the testing time, the actor plays a role of the agent.

* * * * *